(12) United States Patent
Somerville

(10) Patent No.: US 8,899,133 B1
(45) Date of Patent: Dec. 2, 2014

(54) HYDRAULIC PULLER DEVICE

(76) Inventor: Dean S. Somerville, Cooperstown, ND (US)

( * ) Notice: Subject to any disclaimer, the term of this patent is extended or adjusted under 35 U.S.C. 154(b) by 694 days.

(21) Appl. No.: 13/219,766

(22) Filed: Aug. 29, 2011

(51) Int. Cl.
  *B25B 13/50* (2006.01)
  *B25B 17/00* (2006.01)
  *B23P 19/04* (2006.01)
  *E21B 19/00* (2006.01)
  *E21B 19/16* (2006.01)

(52) U.S. Cl.
  CPC .............. *E21B 19/00* (2013.01); *E21B 19/165* (2013.01); *E21B 19/164* (2013.01)
  USPC ........... 81/57.34; 81/57.11; 81/57.18; 29/252

(58) Field of Classification Search
  CPC ............................... E21B 19/00; B60B 29/00
  USPC .................. 29/252, 261, 265, 258, 263, 264; 269/17; 81/57.11, 57.18
  See application file for complete search history.

(56) References Cited

U.S. PATENT DOCUMENTS

2005/0061112 A1* 3/2005 Liess ........................... 81/57.24
2009/0126536 A1* 5/2009 Begnaud et al. ............. 81/57.34

* cited by examiner

*Primary Examiner* — Lee D Wilson
*Assistant Examiner* — Seahee Yoon
(74) *Attorney, Agent, or Firm* — Dave Alan Lingbeck

(57) ABSTRACT

A hydraulic puller device for pulling bearings, gears, wheels and pulleys from objects such as shafts and axles and other machine parts. The hydraulic puller device includes a mobile base assembly, a jaw assembly being mounted to the base assembly and including a plurality of jaw members, a press assembly being mounted to the base assembly for urging against an object to facilitate the removal of a press fitted work piece, and a control assembly being in fluid communication with the base assembly, the jaw assembly and the ram assembly.

15 Claims, 4 Drawing Sheets

HYDRAULIC PULLER DEVICE

BACKGROUND OF THE INVENTION

1. Field of the Invention

The present invention relates to puller devices and more particularly pertains to a new hydraulic puller device for pulling bearings, gears, wheels and pulleys from objects such as shafts and axles and other machine parts.

2. Description of the Prior Art

The use of puller devices is known in the prior art. More specifically, puller devices heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a puller being vertically movably mounted on a transport cart and including a base assembly having at least a pair of puller jaws pivotally mounted thereto. The puller jaws are pivotally moved relative to the base assembly by means of a cam ring which is axially moved with respect to the base assembly by means of a plurality of hydraulic cylinders connected thereto. A hydraulic ram is mounted in the base assembly and has a ram point adapted to engage the end of the shaft upon which the gear is mounted. Another prior art includes a hydraulically powered locking puller device comprising a base assembly about a central axis, a camming assembly circumferentially about the base assembly, and an hydraulic module axially centered within the base assembly. The base assembly has a cylindrical housing wall united to an anchor ring carrying at least two claw members and having an internally threaded cylindrical surface. The camming assembly includes a mooring ring mounted on the housing wall of the base assembly for axial movement therealong and a cam ring axially spaced from a coupler on the mooring ring. The cam ring is in camming relationship to the claw members. The hydraulic module includes a plunger with a replaceable tip, a spring retractor, a carrying ring for hoist movement of the puller, and threads for cooperative threading with the internal threads of the anchor ring to fix the hydraulic module against axial shift, but yet permit easy removal of it for servicing and replacement without disturbing any part of the relationship and elements of the base assembly and camming assembly. A shoulder within the anchor ring provides an abutment against which the hydraulic module is lodged in assembly. While these devices fulfill their respective, particular objectives and requirements, the aforementioned patents do not disclose the present hydraulic puller device.

SUMMARY OF THE INVENTION

The general purpose of the present invention, which will be described subsequently in greater detail, is to provide a new hydraulic puller device which has many of the advantages of the puller devices mentioned heretofore and many novel features that result in a new hydraulic puller device which is not anticipated, rendered obvious, suggested, or even implied by any of the prior art puller devices, either alone or in any combination thereof. The present invention includes a mobile base assembly, a jaw assembly being mounted to the base assembly and including a plurality of jaw members, a press assembly being mounted to the base assembly for urging against an object to facilitate the removal of a press fitted work piece, and a control assembly being in fluid communication with the base assembly, the jaw assembly and the ram assembly. None of the prior art includes the combination of the elements of the present invention.

There has thus been outlined, rather broadly, the more important features of the hydraulic puller device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new hydraulic puller device which has many of the advantages of the puller devices mentioned heretofore and many novel features that result in a new hydraulic puller device which is not anticipated, rendered obvious, suggested, or even implied by any of the prior art puller devices, either alone or in any combination thereof.

Still another object of the present invention is to provide a new hydraulic puller device for pulling bearings, gears, wheels and pulleys from objects such as shafts and axles and other machine parts.

Still yet another object of the present invention is to provide a new hydraulic puller device that prevents the jaws from springing back due to the cage member.

Even still another object of the present invention is to provide a new hydraulic puller device that provides flexibility in a variety of pull strokes up to 48 inches.

Also another object of the present invention is to provide a new hydraulic puller device that has adjustable jaw guides to either increase or decrease the spread preference as is necessary.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
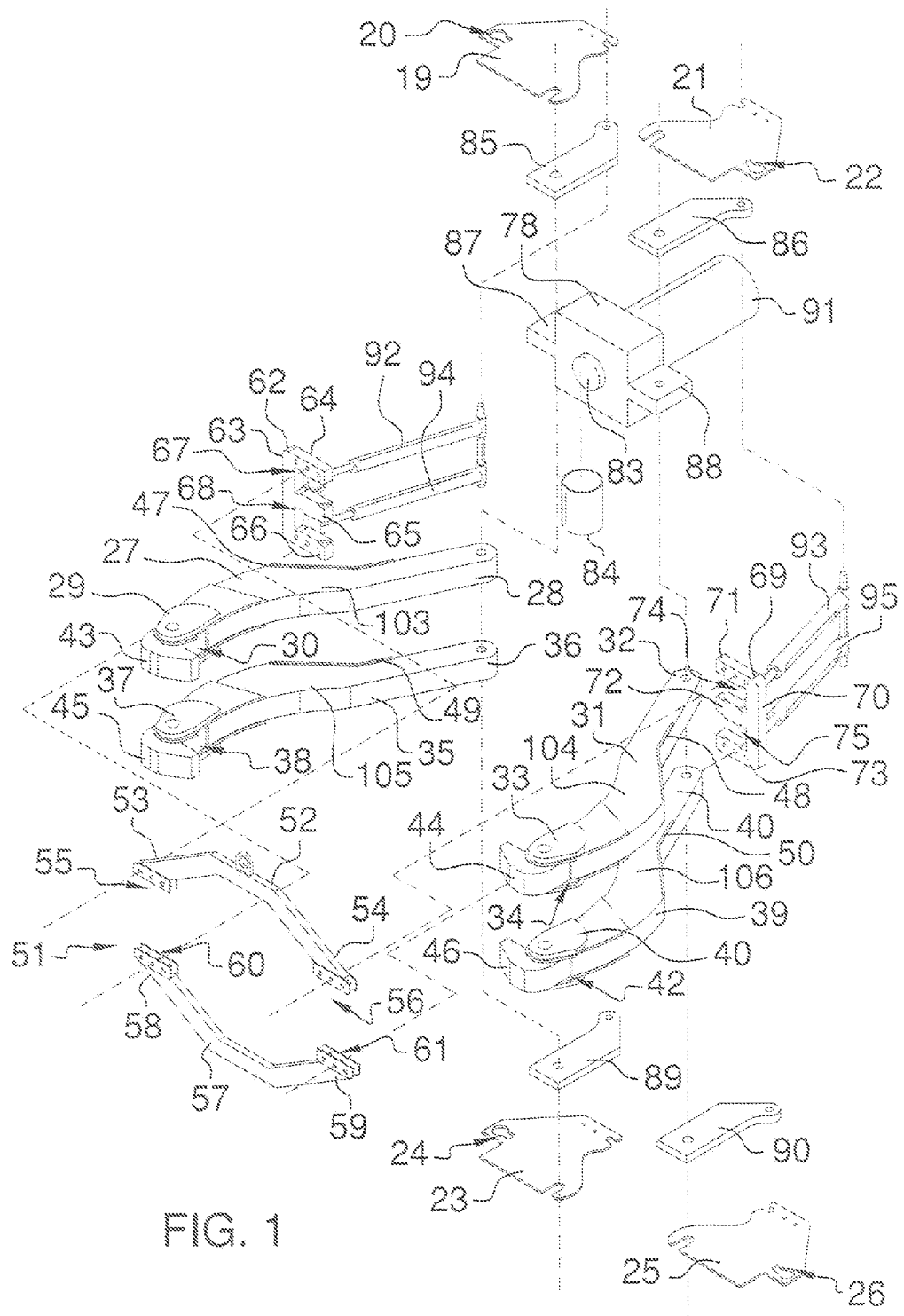
FIG. 1 is an exploded perspective view of a new hydraulic puller device according to the present invention.
Figure 2:
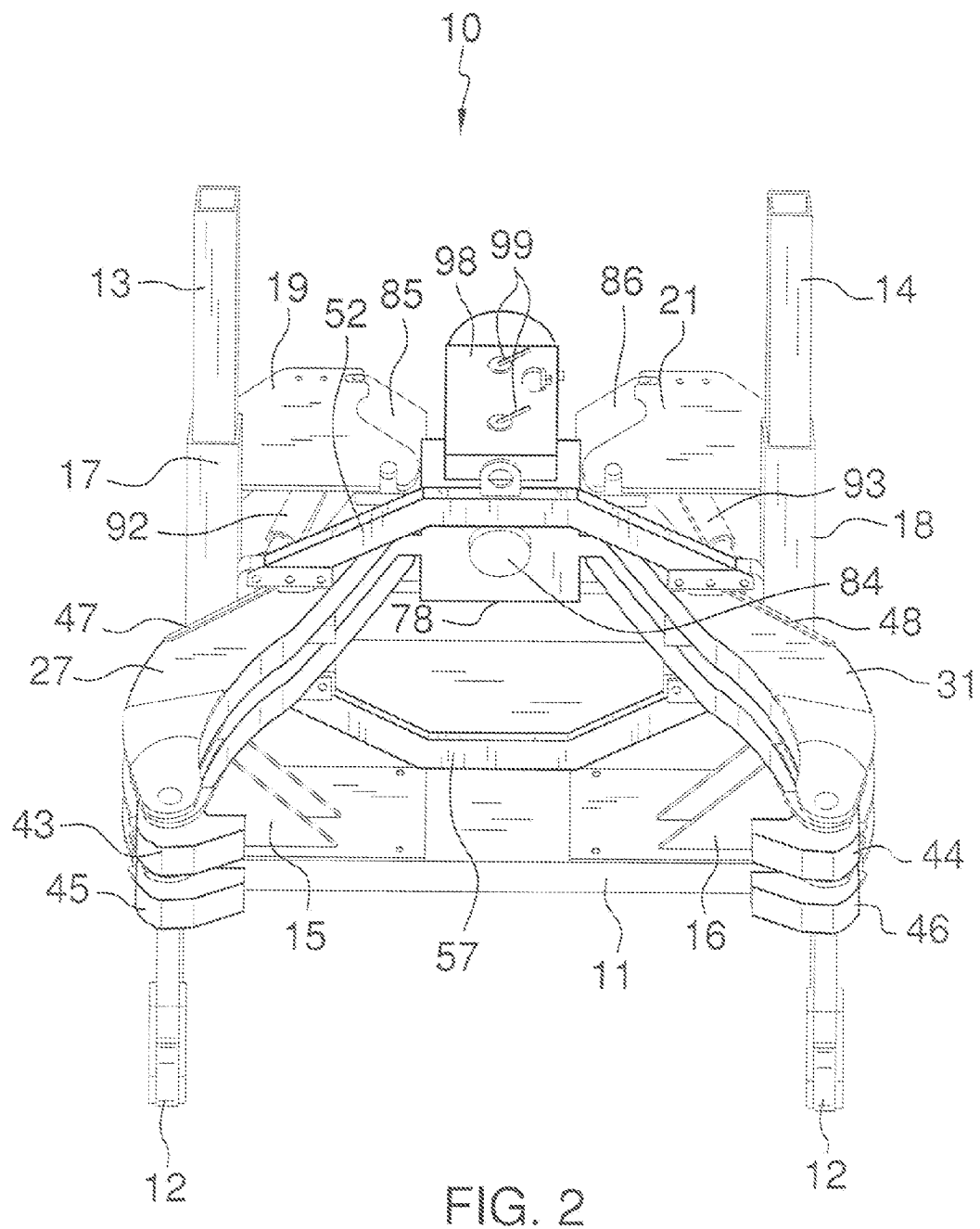
FIG. 2 is a top, front perspective view of the present invention.
Figure 3:
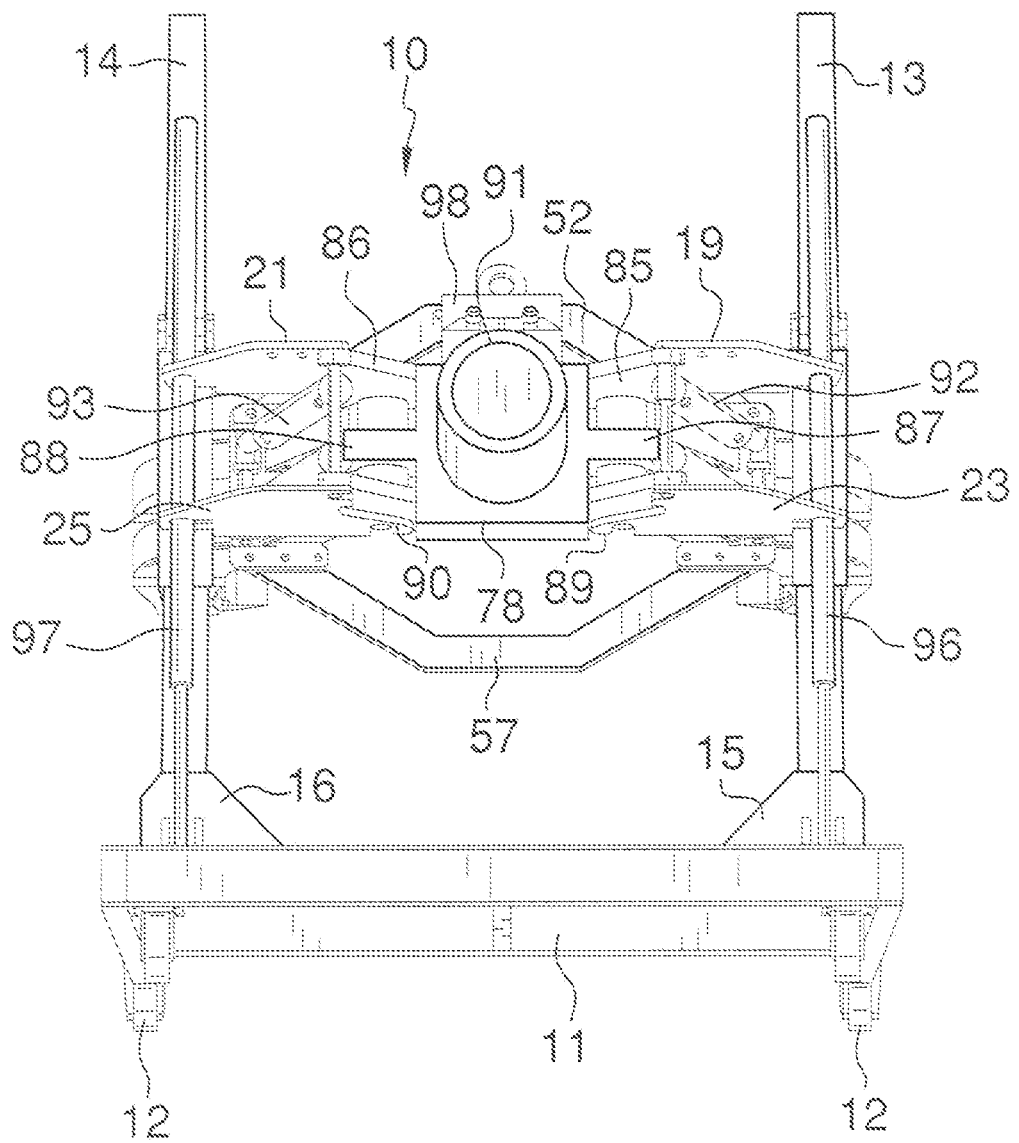
FIG. 3 is a bottom, rear view of the present invention.
Figure 4:
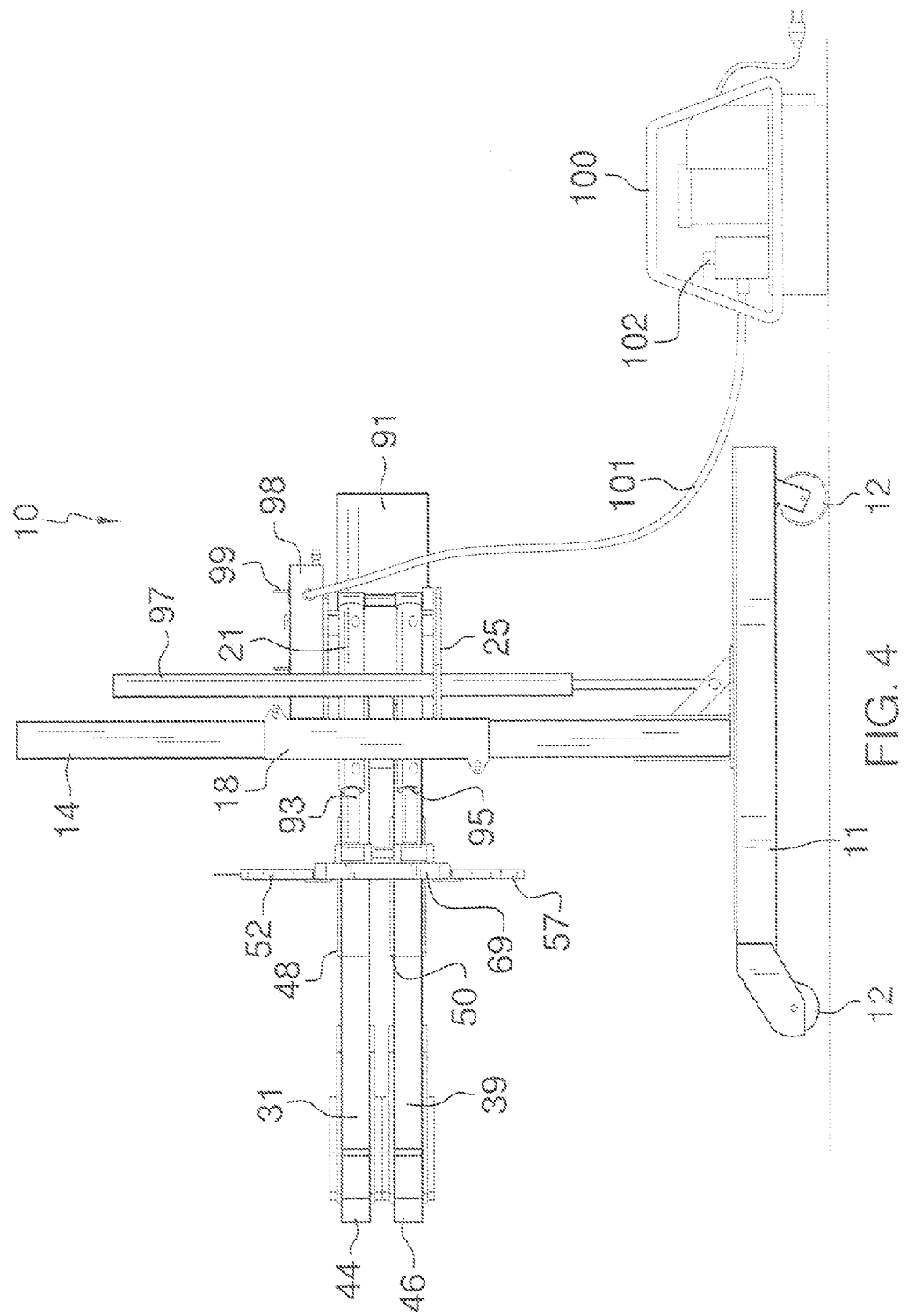
FIG. 4 is a side elevational view of the present invention.

With reference now to the drawings, and in particular to FIGS. 1 through 4 thereof, a new hydraulic puller device embodying the principles and concepts of the present invention and generally designated by the reference numeral 10 will be described.

As best illustrated in FIGS. 1 through 4, the hydraulic puller device 10 generally comprises a mobile base assembly 11-26, a jaw assembly 27-77 being mounted to the base assembly 11-26 and including a plurality of jaw members 27,31,35,39, a press assembly 78-90 being mounted to the base assembly 11-26 for urging against an object to facilitate the removal of a press fitted work piece, and a control assembly 91-102 being in fluid communication with the base assembly 11-26, the jaw assembly 27-77 and the press assembly 78-90.

The mobile base assembly 11-26 includes a base member 11 being conventionally mounted upon a set of wheels 12 and also includes vertically-extending masts 13-14 being spaced apart and being securely supported upon the base member 11 with braces 15-16 which are conventionally welded to the masts 14-14 and to the base member 11.

The support assembly 17-26 includes sleeves 17-18 being movably disposed upon and about the masts 13-14 and also includes planar support members 19,21,23,25 being conventionally attached to the sleeves 17-18 and extending between the masts 13-14. The support members 19,21,23,25 include upper and lower support members 19,21,23,25 being vertically spaced apart. The upper and lower support members 19,21,23,25 have openings 20,22,24,26 being disposed therethrough.

Each jaw member 27,31,35,39 has proximate and distal ends 28,29,32,33,36,37,40,41 and has at least a laterally-curved portion 103-106. The proximate ends 28,32,36,40 of the jaw members 27,31,35,39 are pivotally mounted about vertical axes and conventionally connected to the support members 19,21,23,25. Each of the jaw members 27,31,35,39 has a longitudinal flange 47-50 extending either upwardly or downwardly along at least a portion of an outer edge of each jaw member 27,31,35,39. Each jaw member 27,31,35,39 has an arcuate work-piece engagement member 43-46 having a generally claw-like end and being pivotally mounted about a vertical axis and being conventionally attached with a bolt at the distal end 29,33,37,41 thereof for precise engagement to the work piece. The distal end 29,33,37,41 of each jaw member 27,31,35,39 has a longitudinal slot 30,34,38,42 for receiving at least a portion of a respective work-piece engagement member 43-46. The jaw members 27,31,35,39 include a first pair of jaw members 27,31 with the jaw members 27,31 being horizontally opposed to one another. The jaw members 27,31,35,39 further include a second pair of jaw members 35,39 with the jaw members 35,39 thereof being horizontally opposed to one another and being vertically aligned with and spaced apart from the first pair of jaw members 27,31.

The jaw support assembly 51-77 includes a support frame 51 being movably disposed about and along the jaw members 27,31,35,39. The support frame 51 includes upper and lower elongate guide support members 52,57 and jaw guide members 62,69 being horizontally adjustable relative to the upper and lower elongate guide support members 52,57 to adjust the horizontal positioning of the jaw members 27,31,35,39, and the jaw guide members 62,69 are conventionally fastened to the upper and lower elongate guide support members 52,57 and are engagable to the longitudinal flanges 47-50 for moving the jaw members 27,31,35,39 inwardly and outwardly relative to one another. Each upper and lower elongate guide support member 52,57 has opposed ends 53-54,58-59 with slots 55-56,60-61 being disposed therein. Each jaw guide member 62,69 has a vertically-disposed elongate main portion 63,70 and a plurality of cross portions 64-66,71-73 extending generally perpendicular to the elongate main portion 63,70 and being spaced apart from one another and also having lengths which are shorter than the elongate main portion 63,70. The cross portions 64-66,71-73 of each jaw guide member 62,69 include an upper, middle and lower cross portions 64-66,71-73. Each upper cross portion 64,71 is adjustably and conventionally fastened with bolts in a respective one of the slots 55,56 of the upper elongate guide support member 52. Each lower cross portion 66,73 is adjustably and conventionally fastened with bolts in a respective one of the slots 60,61 of the lower elongate guide support member 57. Each middle cross portion 65,72 is disposed between a respective pair of vertically-aligned the jaw members 27,31, 35,39. Each upper cross portion 64,71 has a slot 67-68 being disposed in a bottom thereof with the longitudinal flanges 47-48 of the first pair of jaw members 27,31 being received in the slots 67-68 of the upper cross portions 64,71. Each middle cross portion 65,72 has a slot 74,75 being disposed in a bottom thereof with the longitudinal flanges 49,50 of the second pair of jaw members 35,39 being received in the slots 74,75 of the middle cross portions 65,72.

The press assembly 78-90 includes a housing 78 having walls and an opening disposed through one of the walls 81 with the housing 78 being disposed between the masts 13-14, and also includes brackets 85-90 being conventionally attached and welded to the housing 78 and being securely and conventionally connected with bolts to the support members 19,21,23,25, and further includes a press connector 83 being movably disposed in the housing 78 and through the opening of the housing 78. The press assembly 78-90 also includes press adapters 84 being interchangeably and conventionally connected to the press connector 83 for urging against the object to facilitate removal of the press fitted work piece. The brackets 85-90 includes upper, middle and lower brackets 85-90 being conventionally attached and welded to the housing 78 and extending outwardly from opposite sides of the housing 78.

The control assembly 91-102 includes a first hydraulic cylinder 91 being conventionally mounted to the housing 78 and being engaged to the press connector 83 for actuating the press connector 83 and the press adapters 84, and also includes second hydraulic cylinders 92-95 being conventionally connected to the support members 19,21,23,25 and to the support frame 51 via brackets 76-77 with fasteners such as bolts for actuating and moving the support frame 51 which engages and moves the jaw members 27,31,35,39, and further includes vertically extending third hydraulic cylinders 96-97 being securely and conventionally mounted with bracket members upon the base member 11 proximate to the masts 13-14 for raising and lowering the jaw members 27,31,35,39, and also includes a control unit 98 being conventionally mounted to the support assembly 17-26 and being in fluid communication with the hydraulic cylinders 91-97 via hoses 101 and having valves 99 for controlling hydraulic fluid to the hydraulic cylinders 91-97, and further includes a hydraulic pump 100 being in fluid communication with the control unit 98 also via hoses 101 for actuating the hydraulic cylinders 91-97. The third hydraulic cylinders 96-97 are securely and conventionally attached to the support members 19,21,23,25 and extend through the openings 20,22,24,26 of the support members 19,21,23,25 for raising and lowering the jaw members 27,31,35,39. Further, the hydraulic assembly 91-102 includes a control switch 102 being in communication with the control unit 98 with wires conventionally interconnecting the control unit 98 to the control switch 102 for operating and controlling the hydraulic cylinders 91-97.

In use, the hydraulic puller device 10 is positioned adjacent to the object and adjacent to the press fitted work piece to be removed from the object. With the control switch 102, either the user actuates the third cylinders 96-97 with hydraulic pressure from the hydraulic pump 100 to raise and lower the jaw members 27,31,35,39 to horizontally position the jaw members 27,31,35,39 relative to the press fitted work piece, or if the jaw members 27,31,35,39 are already positioned correctly, the user actuates the second hydraulic cylinders 92-95 with hydraulic pressure from the hydraulic pump 100 to either spread the jaw members 27,31,35,39 apart with the jaw guide members 62,69 engaging the longitudinal flanges 47-50 so that the work-piece engagement members 43-46 can engage about the press fitted work piece or bring together the jaw members 27,31,35,39 with the jaw guide members 62,69 engaging the longitudinal flanges 47-50 to effectively engage the jaw members 27,31,35,39 about the press fitted work piece. The jaw guide members 62,69 are able to move the jaw members 27,31,35,39 inwardly or outwardly relative to the horizontally-opposed jaw members 27,31,35,39 because of the laterally-curved portions 103-106 of the jaw members 27,31,35,39. Once the work-piece engagement members 43-46 are securely engaged about the press fitted work piece, the user again uses the control switch 102 to direct hydraulic pressure from the hydraulic pump 100 to the first hydraulic cylinder 91 which urges the press connector 83 and the selected press adapter 84 against the object. As the press adapter 84 pushes on the object, the press fitted work piece is removed from the object because the jaw members 27,31,35, 39 remain engaged about the press fitted work piece and the press adapter 84 pushes on the object and moves relative to the jaw members 27,31,35,39.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the hydraulic puller device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A hydraulic puller device comprising:
a mobile base assembly including a base member and vertically-extending masts spaced apart and securely supported upon said base member, wherein said base assembly further includes sleeves movably disposed upon said masts and also includes support members attached to said sleeves and extending between said masts, wherein said support members include upper and lower support members vertically spaced apart, said upper and lower support members having openings disposed therethrough;
a jaw assembly being mounted to said base assembly and including a plurality of jaw members;
a press assembly being mounted to said base assembly for urging against an object to facilitate the removal of a press fitted work piece; and
a control assembly being in fluid communication with said base assembly, said jaw assembly and said press assembly.

2. The hydraulic puller device as described in claim 1, wherein said press assembly includes a housing having walls and an opening disposed through one of the walls and being disposed between said masts, and also includes brackets being attached to said housing and being securely connected to said support members, and further includes a press connector being movably disposed in said housing and through said opening of said housing.

3. A hydraulic puller device comprising:
a mobile base assembly including a base member and vertically-extending masts spaced and securely supported upon said base member, wherein said base assembly further includes sleeves movably disposed upon said masts and also includes support members attached to said sleeves and extending between said masts;
a jaw assembly being mounted to said base assembly and including a plurality of jaw members, wherein each said jaw member has proximate and distal ends and has at least a laterally-curved portion, said proximate ends of said jaw members pivotally connected to said support members, each of said jaw members having a longitudinal flange extending along at least a portion of each said jaw member;
a press assembly being mounted to said base assembly for urging against an object to facilitate the removal of a press fitted work piece; and
a control assembly being in fluid communication with said base assembly, said jaw assembly and said press assembly.

4. The hydraulic puller device as described in claim 3, wherein each said jaw member has an arcuate work-piece engagement member being pivotally attached at said distal end thereof for precise engagement to the work piece.

5. The hydraulic puller device as described in claim 4, wherein said distal end of each said jaw member has a longitudinal slot for receiving at least a portion of a respective said work-piece engagement member.

6. The hydraulic puller device as described in claim 3, wherein said jaw assembly further includes a support frame being movably disposed about said jaw members, said support frame including upper and lower elongate guide support members and jaw guide members being adjustably fastened to said upper and lower elongate guide support members and being engageable to said longitudinal flanges for moving said jaw members relative to one another.

7. The hydraulic puller device as described in claim 6, wherein each said upper and lower elongate guide support members has opposed ends with slots disposed therein.

8. The hydraulic puller device as described in claim 7, wherein each said jaw guide member has an elongate main portion and a plurality of cross portions extending generally perpendicular to said elongate main portion and being spaced apart from one another.

9. The hydraulic puller device as described in claim 8, wherein said cross portions of each said jaw guide member include upper, middle and lower cross portions, each said upper cross portion being adjustably fastened in a respective one of said slots of said upper elongate guide support member, each said lower cross portion being adjustably fastened in a respective one of said slots of said lower elongate guide support member, each said middle cross portion being disposed between a respective pair of vertically-aligned said jaw members.

10. The hydraulic puller device as described in claim 9, wherein at least two of said cross portions have slots being disposed therein, said longitudinal flanges of said jaw members being received in said slots of said at least two of said cross portion.

11. The hydraulic puller device as described in claim 9, wherein each said upper cross portion has a slot being disposed in therein, said longitudinal flanges of said first pair of jaw members being received in said slots of said upper cross portions, wherein each said middle cross portion has a slot being disposed therein, said longitudinal flanges of said second pair of jaw members being received in said slots of said middle cross portions.

12. The hydraulic puller device as described in claim 2, wherein said press assembly also includes at least one press adapter being removably connected to said press connector for urging against the object to facilitate removal of the press fitted work piece.

13. The hydraulic puller device as described in claim 2, wherein said brackets includes upper, middle and lower brackets being attached to said housing and extending outwardly from opposite sides of said housing.

14. The hydraulic puller device as described in claim 12, wherein said control assembly includes a first hydraulic cylinder being mounted to said housing for actuating said press connector and said at least one press adapter, and also includes second hydraulic cylinders being connected to said support member for moving said jaw members, and further includes vertically extending third hydraulic cylinders being securely mounted upon said base member proximate to said masts for raising and lowing said jaw members, and also includes a control unit being in fluid communication with said hydraulic cylinders and having valves far controlling hydraulic fluid to said hydraulic cylinders, and further includes a hydraulic pump being in fluid communication with said control unit for actuating said hydraulic cylinders.

15. The hydraulic puller device as described in claim 14, wherein said third hydraulic cylinders are securely attached to said support members and extend through said openings of said support members for raising and lowering said jaw members.

* * * * *